UNITED STATES PATENT OFFICE.

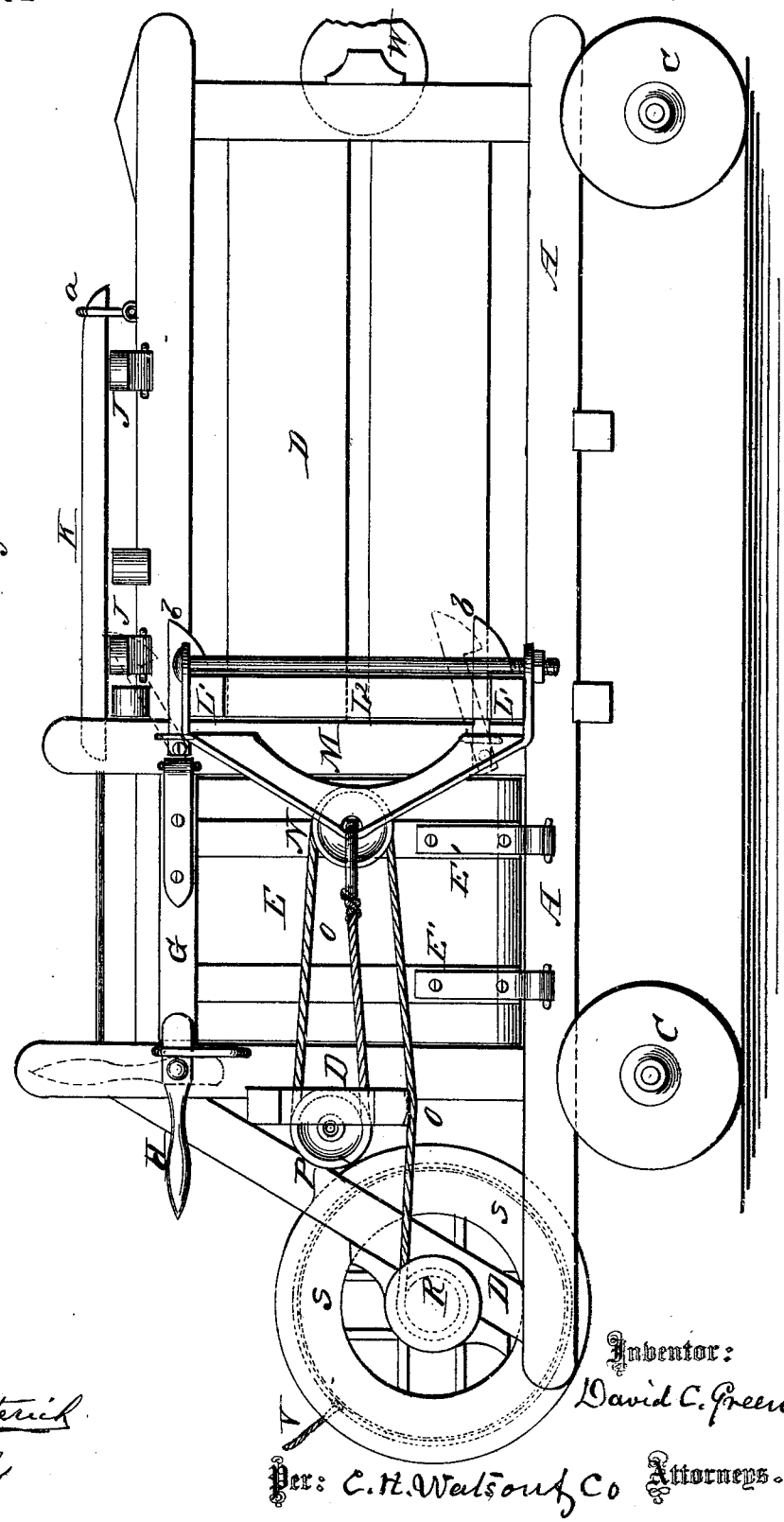

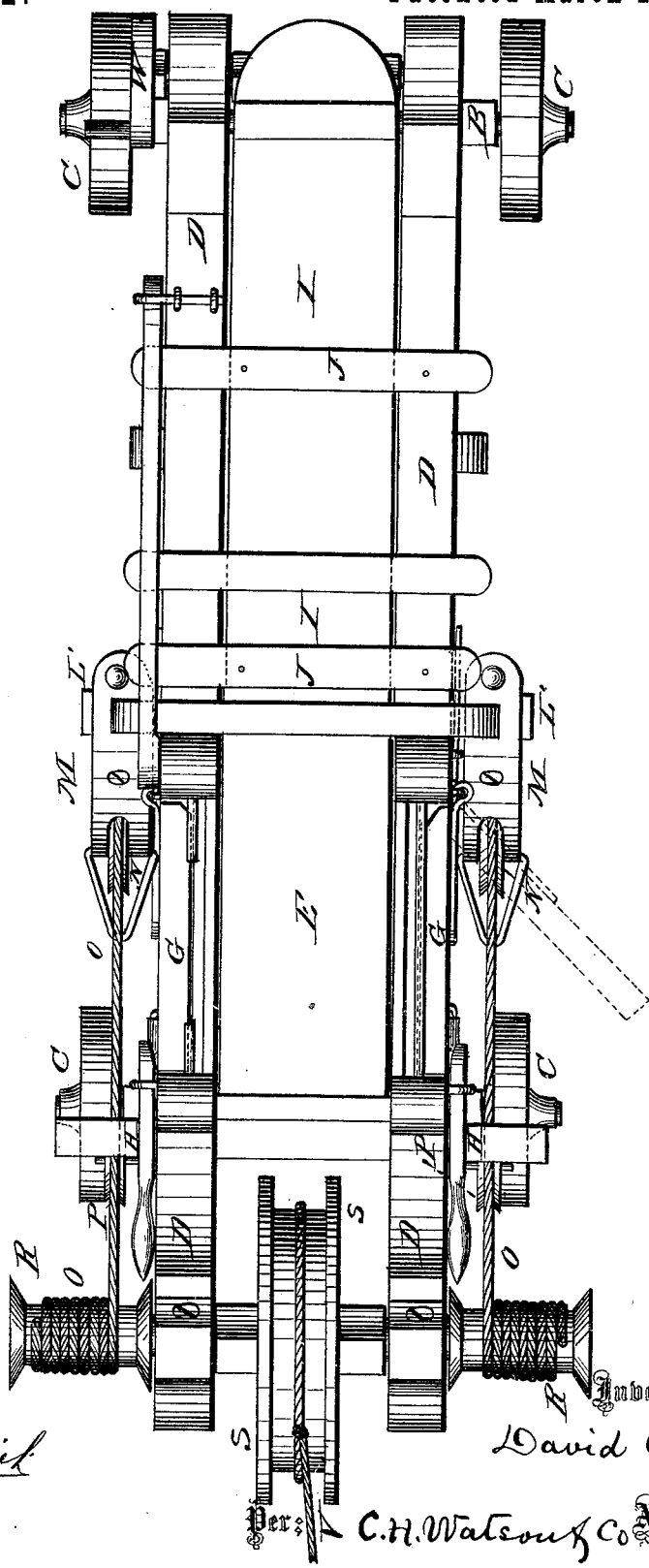

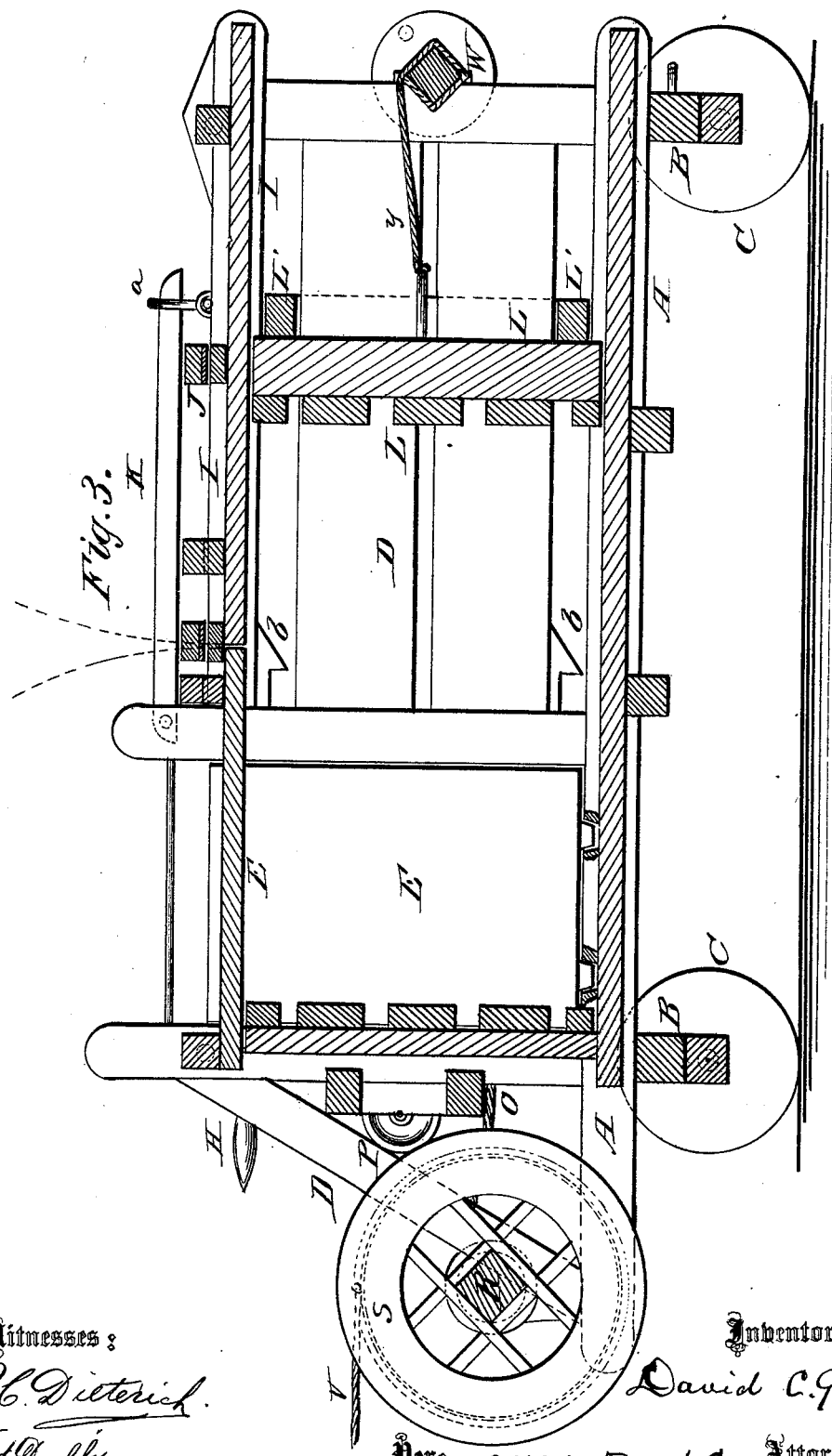

DAVID C. GREEN, OF UNION CITY, TENNESSEE.

IMPROVEMENT IN HAY-PRESSES.

Specification forming part of Letters Patent No. 174,952, dated March 21, 1876; application filed February 15, 1876.

*To all whom it may concern:*

Be it known that I, DAVID C. GREEN, of Union City, in the county of Obion and State of Tennessee, have invented certain new and useful Improvements in Hay-Presses; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a hay-press mounted on wheels, as will be hereinafter more fully set forth.

In the annexed drawings, Figure 1 represents a side elevation, Fig. 2 represents a plan or top view, and Fig. 3 represents a central vertical section, of my invention.

A A represent two parallel sills, secured upon the axles B B, which have the wheels C C on their ends. On the sills A A is erected a suitable frame-work, in which is formed the horizontal bale-box. The end of the bale-box in which the bale is pressed is closed on top, and is provided with side doors E E, which are hinged at their lower ends, and have on their outer sides vertical bars E', extending below the door, and fitting in mortises in the sills A when the doors are closed to take all strain off from the hinges.

When the door E is closed a hinged cross-bar, G, is thrown across its upper end, and this cross-bar is held by means of a pivoted lever, H, as shown.

That part of the bale-box in which the hay is placed to be pressed has a hinged top, I, across which, when closed, are thrown two hinged cross-bars, J J, and the outer ends of said cross-bars are held down by means of a pivoted bar, K, held by a stirrup, *a*.

L represents the follower in the bale-box, said follower having top and bottom bars L¹ extending beyond the sides of the bale-box, and connected on each side by an upright, L². To this extension of the follower, on each side, is hinged or pivoted a frame, M, carrying a pulley, N. To this frame is attached one end of a rope, O, which passes around a pulley, P, at the other end of the frame D, thence back and around the pulley N, and forward to a windlass, R, mounted at the end of the frame D.

The frame M, for carrying the pulley N, is hinged to allow the pulley to be in line with the rope as it is wound upon the windlass, as the rope is wound back and forth upon the windlass. The hinging of the frame M also compensates, to a certain extent, the slack in the rope, should one side of the follower be drawn up faster than the other.

This is a double windlass, with a large master-wheel, S, in the center, which wheel has a deep circumferential groove, with a rope, V, wound therein. At the opposite end of the machine is a windlass, W, connected by a rope, Y, with the back of the follower L. After the bale-box has been filled and the doors securely fastened the power is applied to the rope V, which revolves the master-wheel S and the windlasses R, and thereby draws the follower L forward, pressing the bale. When the bale is pressed the follower is held by means of top and bottom hooks *b b* on each side catching on the projecting top and bottom bars L¹ of the follower, thus removing the strain from the ropes and windlasses. These hooks *b* open upward, and are beveled on their inner faces, so that the locking of the follower is automatic and without the aid of springs. As the beveled part of the hooks comes in contact with the bars the hooks are raised, and, as they pass over the bars, fall by their own weight and hold the follower. As soon as the bale is tied it is removed by opening the doors E, the hooks *b* are released, and the follower is drawn back by turning the windlass W.

Having thus fully described my invention, what I claim as new, and desire to secure by Letters Patent, is—

1. The combination of the follower L, extended beyond the sides of the bale-box, as described, the hinged frames M, pulleys N P, ropes O, windlasses R, with master-wheel S, and rope V, as and for the purposes set forth.

2. The follower L, hinged frames M, pulleys N P, ropes O, in combination with the windlass R, rope V, master-wheel S, and the hooks *b*, substantially as and for the purpose set forth.

In testimony that I claim the foregoing as my own I affix my signature in presence of two witnesses.

DAVID C. GREEN.

Witnesses:
 AMBROSE MOODY MULLINS,
 WILLIAM I. INMAN.